(12) United States Patent
Lösch et al.

(10) Patent No.: US 8,114,320 B2
(45) Date of Patent: Feb. 14, 2012

(54) METHOD FOR PRODUCING POLYMER PARTICLES BY THE POLYMERIZATION OF FLUID DROPS IN A GAS PHASE

(75) Inventors: Dennis Lösch, Altrip (DE); Carolin Nadine Dücker, Ludwigshafen (DE); Asif Karim, Mannheim (DE); Andreas Daiss, Deidesheim (DE); Marco Krüger, Mannheim (DE); Volker Spindler, Alteiningen (DE); Stefan Blei, Mannheim (DE); Dieter Ehnes, Kirchheim (DE); Oliver Gampfer, Hochborn (DE); Dieter Reimer, Mutterstadt (DE); Michael Heeger, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 323 days.

(21) Appl. No.: 12/521,939

(22) PCT Filed: Jan. 10, 2008

(86) PCT No.: PCT/EP2008/000133
§ 371 (c)(1),
(2), (4) Date: Jul. 1, 2009

(87) PCT Pub. No.: WO2008/086976
PCT Pub. Date: Jul. 24, 2008

(65) Prior Publication Data
US 2009/0315204 A1    Dec. 24, 2009

(30) Foreign Application Priority Data
Jan. 16, 2007 (EP) .................................. 07100591

(51) Int. Cl.
*B29B 9/00* (2006.01)
(52) U.S. Cl. ............. 264/13; 264/5; 264/14; 528/502 E; 528/502 F
(58) Field of Classification Search .................. None
See application file for complete search history.

(56) References Cited

U.S. PATENT DOCUMENTS

| 5,269,980 | A | 12/1993 | Levendis et al. |
| 5,962,606 | A | 10/1999 | Williams et al. |
| 2007/0178163 | A1* | 8/2007 | Kodas et al. .................. 424/489 |
| 2008/0045624 | A1 | 2/2008 | Losch et al. |
| 2008/0188586 | A1 | 8/2008 | Bruhns et al. |
| 2008/0188821 | A1 | 8/2008 | Losch et al. |
| 2008/0194778 | A1 | 8/2008 | Losch et al. |
| 2008/0242817 | A1 | 10/2008 | Ducker et al. |
| 2009/0192035 | A1 | 7/2009 | Stueven et al. |
| 2009/0192036 | A1 | 7/2009 | Losch et al. |
| 2009/0239071 | A1 | 9/2009 | Stueven et al. |
| 2009/0258994 | A1 | 10/2009 | Stueven et al. |

FOREIGN PATENT DOCUMENTS

| EP | 1 083 192 A1 | 3/2001 |
| EP | 10 2004 042946 A1 | 3/2006 |
| EP | 1 721 661 A1 | 11/2006 |
| JP | 2006 089737 A | 4/2006 |
| WO | WO-98/37101 A1 | 8/1998 |
| WO | WO-2006/077054 A1 | 7/2006 |
| WO | WO-2006/079631 A1 | 8/2006 |
| WO | WO-2006/114404 A1 | 11/2006 |
| WO | WO-2006/120232 A1 | 11/2006 |
| WO | WO-2007/031441 A2 | 3/2007 |
| WO | WO-2007/093531 A1 | 8/2007 |
| WO | WO-2008/009580 A1 | 1/2008 |
| WO | WO-2008/009598 A1 | 1/2008 |
| WO | WO-2008/009599 A1 | 1/2008 |
| WO | WO-2008/009611 A1 | 1/2008 |
| WO | WO-2008/009612 A1 | 1/2008 |
| WO | WO-2008/040714 A2 | 4/2008 |
| WO | WO-2008/040715 A2 | 4/2008 |
| WO | WO-2008/052971 A1 | 5/2008 |
| WO | WO-2008/077779 A1 | 7/2008 |
| WO | WO-2008/077780 A1 | 7/2008 |

OTHER PUBLICATIONS

Deutsche Anmeldung mit dem Aktenzeichen 10 2006 001 596.7.
International Search Report in PCT/EP2008/000133 dated Apr. 15, 2008.

* cited by examiner

Primary Examiner — Mary F Theisen
(74) Attorney, Agent, or Firm — Marshall, Gerstein & Borun LLP (57) ABSTRACT

A process for producing polymer particles by polymerizing liquid droplets in a gas phase by metering a liquid comprising at least one monomer from at least one feed by means of a multitude of bores into a reaction chamber comprising the gas phase, wherein ratio of length of the feed to greatest diameter of the feed in the region of the multitude of bores is at least 10.

23 Claims, 6 Drawing Sheets

METHOD FOR PRODUCING POLYMER PARTICLES BY THE POLYMERIZATION OF FLUID DROPS IN A GAS PHASE

CROSS-REFERENCE TO RELATED APPLICATIONS

This is the U.S. national phase of International Application No. PCT/EP2008/000133, filed Jan. 10, 2008, which claims the benefit of European Patent Application No. 07100591.2, filed Jan. 16, 2007.

The present invention relates to a process for producing polymer particles by polymerizing liquid droplets in a gas phase, wherein a liquid comprising at least one monomer is metered from at least one feed by means of a multitude of bores into a reaction chamber comprising the gas phase and the ratio of length of the feed to greatest diameter of the feed in the region of the multitude of bores is at least 10, and to an apparatus for performing the process.

U.S. Pat. No. 5,269,980 describes a process for polymerizing monodisperse droplet chains in a surrounding heated gas phase. The droplet chains are obtained by virtue of the solution to be polymerized passing through a multitude of bores of defined size in a circular plate.

Polymerization of liquid droplets in a gas phase allows the process steps of polymerization and drying to be combined. In addition, the particle size can be set within certain limits by suitable process control.

It was an object of the present invention to provide an improved process for producing polymer particles by polymerizing liquid droplets in a gas phase surrounding the droplets.

In particular, it was an object of the present invention to provide a process which generates polymer particles with homogeneous properties.

The object was achieved by a process for producing polymer particles by polymerizing liquid droplets in a gas phase by metering a liquid comprising at least one monomer from at least one feed (1) by means of a multitude of bores into a reaction chamber comprising the gas phase, wherein the ratio of length of the feed (1) to greatest diameter of the feed (1) in the region of the multitude of bores is at least 10.

The ratio of length of the feed (1) to greatest diameter of the feed (1) in the region of the multitude of bores is preferably at least 50, more preferably at least 100, most preferably at least 200.

The length of the feed (1) in the region of the multitude of bores is preferably from 0.5 to 10 m, more preferably from 1 to 8 m, most preferably from 2 to 5 m.

The greatest internal diameter of the feed (1) in the region of the multitude of bores is preferably from 1 to 100 mm, more preferably from 2.5 to 50 mm, most preferably from 5 to 25 mm.

The arrangement of the feed (1) is not subject to any restriction. Suitable feeds (1) are, for example, tubes which project horizontally into the upper part of the reaction chamber. The tubes may be straight, curved or spiral-shaped.

In a preferred embodiment of the present invention, a plurality of feeds (1) lead radially into the upper part of the reaction chamber.

The feeds (1) are preferably free of bores in the edge region of the reaction chamber, i.e. the bores have a sufficient distance from the wall of the reaction chamber.

The multitude of bores is preferably arranged in one or more rows along the feed (1), more preferably in at least two rows, most preferably in three rows, the rows with the bores preferably being arranged offset with respect to one another.

The diameter of the bores is preferably from 50 to 1000 µm, more preferably from 75 to 600 µm, most preferably from 100 to 300 µm.

The separation of the bores is preferably from 1 to 50 mm, more preferably from 2.5 to 20 mm, most preferably from 5 to 8 mm, of the bore diameter.

The number and size of the bores are selected according to the desired capacity and droplet size. The droplet diameter is typically 1.9 times the diameter of the bores. The feeds (1) are operated in the flow range of laminar jet decomposition, i.e. the Reynolds number based on the throughput per bore and the bore diameter is preferably less than 2000, preferentially less than 1000, more preferably less than 500, most preferably less than 100. The pressure drop over the bore is preferably from 0.1 to 10 bar, more preferably from 0.2 to 5 bar, most preferably from 0.5 to 3 bar. Too high a pressure drop leads to the spraying of the liquid, i.e. to polydisperse droplets. Too low a pressure drop, which is in the region of the pressure drop over the line (1) itself, leads to significant differences in the pressure drops over the bores along the feed (1).

The droplets generated have a mean diameter of preferably from 200 to 800 µm, more preferably from 300 to 700 µm, most preferably from 400 to 600 µm, the droplet diameter being determinable by light scattering and meaning the volume-average mean diameter.

In order to achieve higher throughputs, it is necessary to increase the number of bores. For example, U.S. Pat. No. 5,269,980 describes a circular dropletizer plate with a multitude of bores, some of the bores being present at the edge and a further portion of the bores being present in the center of the dropletizer plate.

The present invention is based on the finding that, in the metering of the liquid via a multitude of bores, the outer droplet chains screen the inner droplet chains. As a result, the inner droplet chains are heated more slowly, as a result of which the polymerization of the inner droplet chains starts later and less reaction time is available. This effect is enhanced especially in the case of an industrial scale implementation with the large number of bores needed here, i.e. inhomogeneous particle mixtures are expected especially in the industrial scale implementation owing to different reaction times.

Figure 1:
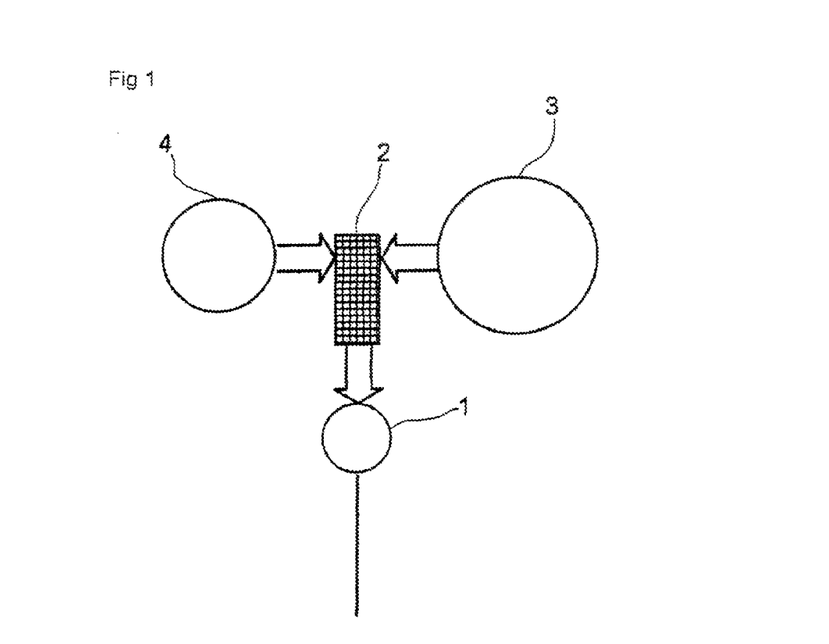
FIGS. 1 and 2 show a cross section and a longitudinal section of a preferred embodiment of the present invention.
Figure 2:
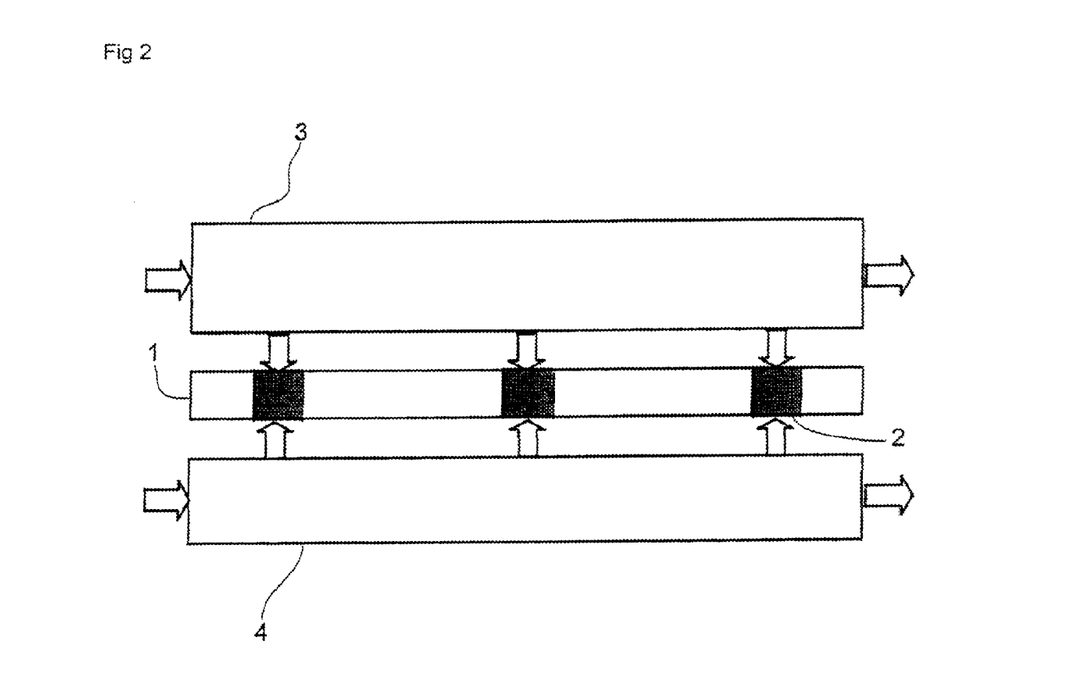

FIGS. 1 and 2 show a cross section and a longitudinal section of a preferred embodiment of the present invention.

In this preferred embodiment, the liquid passes into the feed (1) through a plurality of feeds (2). The separation of the feeds (2) is preferably from 10 to 50 cm, more preferably from 20 to 40 cm, most preferably from 25 to 35 cm.

The use of a plurality of feeds (2) leads to optimized flow conditions in the feed (1), fewer dead spaces and a prolonged service life.

The liquid preferably passes into the feed (2) through a feed (3), and a second liquid comprising at least one initiator through a feed (4), the liquid and the second liquid in the feed (2) preferably being mixed by means of a static mixer.

The ratio of length of the feed (3) to greatest diameter of the feed (3) is typically at least 10, preferably at least 50, more preferably at least 100, most preferably at least 200.

The length of the feed (3) is preferably 0.5 to 10 m, more preferably from 1 to 8 m, most preferably from 2 to 5 m.

The greatest internal diameter of the feed (3) is preferably from 5 to 200 mm, more preferably from 10 to 100 mm, most preferably from 20 to 50 mm.

The feed (3) preferably has a uniform cross section. Circular cross sections are particularly preferred.

The ratio of length of the feed (4) to greatest diameter of the feed (4) is typically at least 10, preferably at least 50, more preferably at least 100, most preferably at least 200.

The length of the feed (4) is preferably from 0.5 to 10 m, more preferably from 1 to 8 m, most preferably from 2 to 5 m.

The greatest internal diameter of the feed (4) is preferably from 2.5 to 150 mm, more preferably from 5 to 75 mm, most preferably from 10 to 50 mm.

The feed (1) preferably has a uniform cross section. Circular cross sections are particularly preferred.

Preference is given to cooling at least one of the feeds (1), (2), (3) and (4).

This embodiment enables the use of feeds (1) with a relatively small diameter and relatively low residence time of the mixture comprising monomer and initiator. The greatest internal diameter of the feed (1) in the region of the multitude of bores is preferably from 1 to 50 mm, more preferably from 3 to 25 mm, most preferably from 5 to 10 mm.

Figure 3:
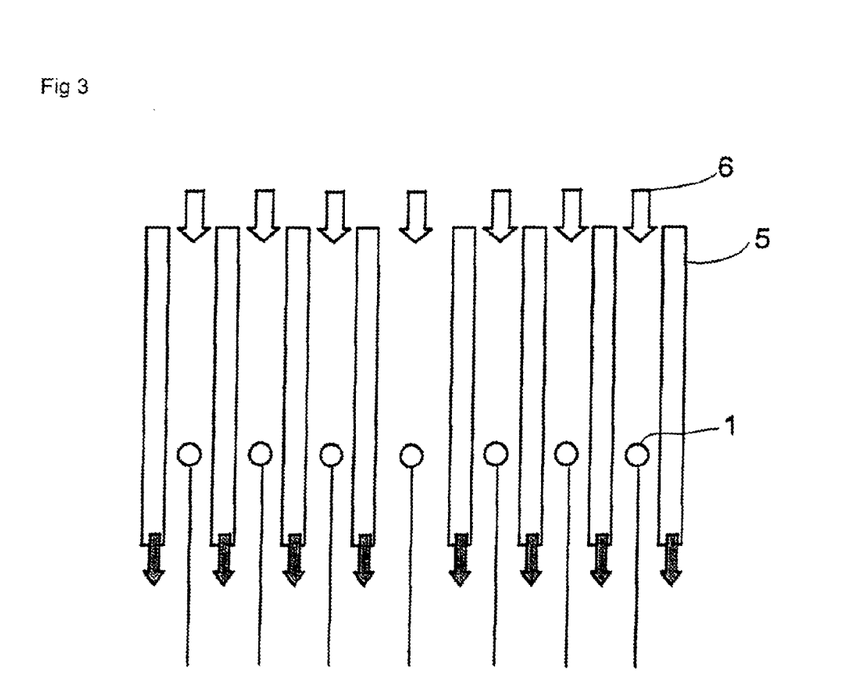
FIG. 3 shows a cross section of a further preferred embodiment of the present invention.

FIG. 3 shows a cross section of a further preferred embodiment of the present invention.

In this further preferred embodiment, gas with a temperature of from 90 to 300° C., preferably from 100 to 250° C., more preferably from 120 to 200° C., most preferably from 150 to 180° C., is introduced from above into the reaction chamber by means of at least one gas feed (5), in which case the at least one gas feed (5) ends below the feed (1).

Gas can be introduced from above into the reaction chamber by means of at least one gas feed (6) with a temperature of from 0 to 60° C., preferably from 5 to 50° C., more preferably from 10 to 40° C., most preferably from 20 to 30° C., in which case the at least one gas feed (6) ends above the feed (1).

These measures prevent undesired heating of the feeds (1), (2), (3) and (4).

The arrangement of the feeds and of the gas feeds is not subject to any restriction. For example, four feeds (1) may project in a straight line into a circular reaction chamber, in which case the feeds (1) are offset relative to one another by 90° in each case and point at the circle center. The gas feeds (5) may then have the shape of a circular segment between reactor wall and two feeds (1).

Figure 4:
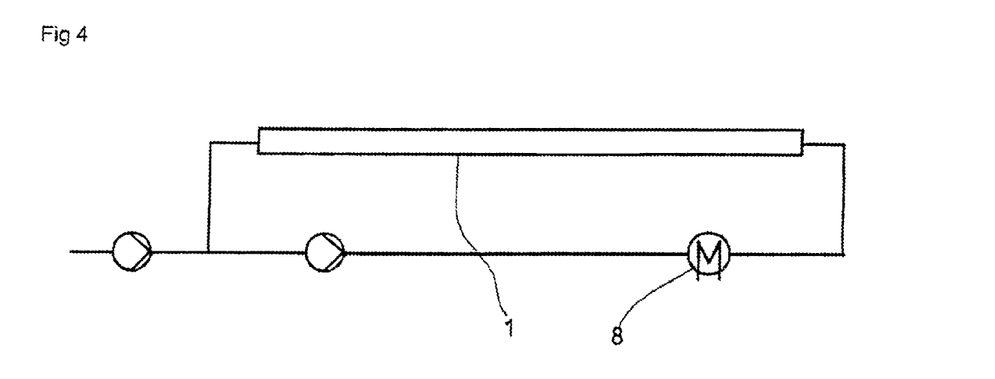
FIGS. 4 and 5 show longitudinal sections of a further preferred embodiment of the present invention.
Figure 5:
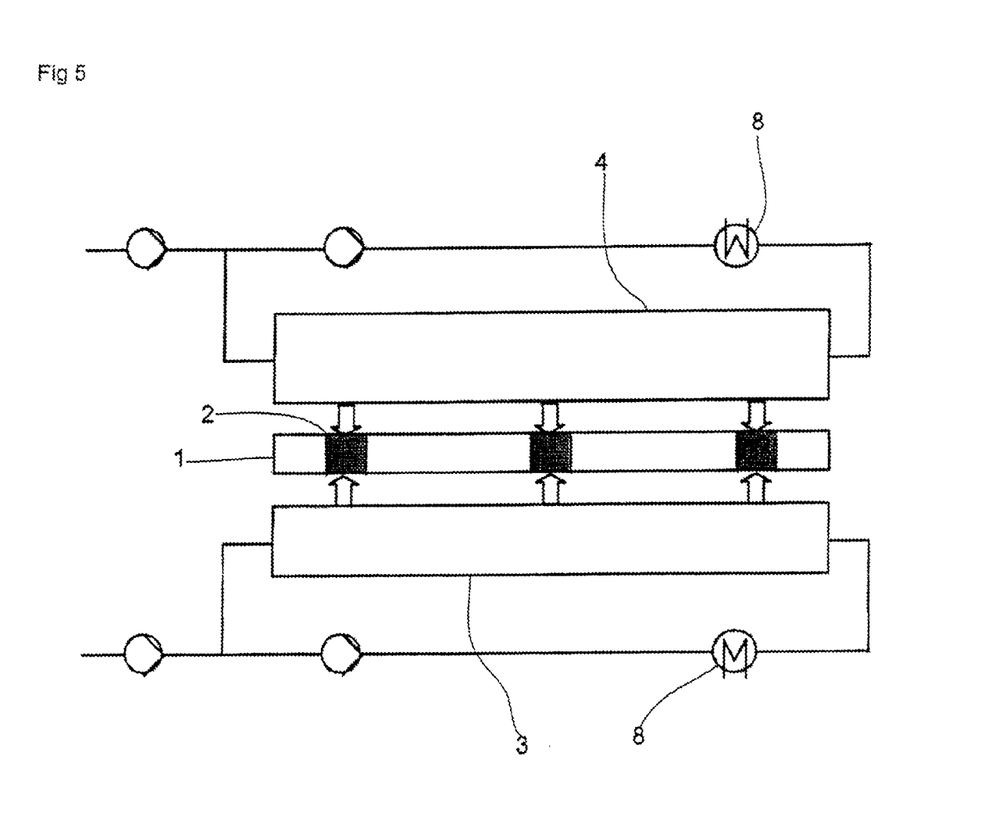

FIGS. 4 and 5 show longitudinal sections of a further preferred embodiment of the present invention.

In this further preferred embodiment, the liquid is conveyed in circulation in at least one of the feeds (1), (3) and (4) partly via a cooler (8).

To this end, it is of course necessary that both ends of the feeds (1), (3) and (4) project out of the reaction chamber.

These measures can likewise prevent undesired heating of the feeds (1), (3) and (4).

Figure 6:
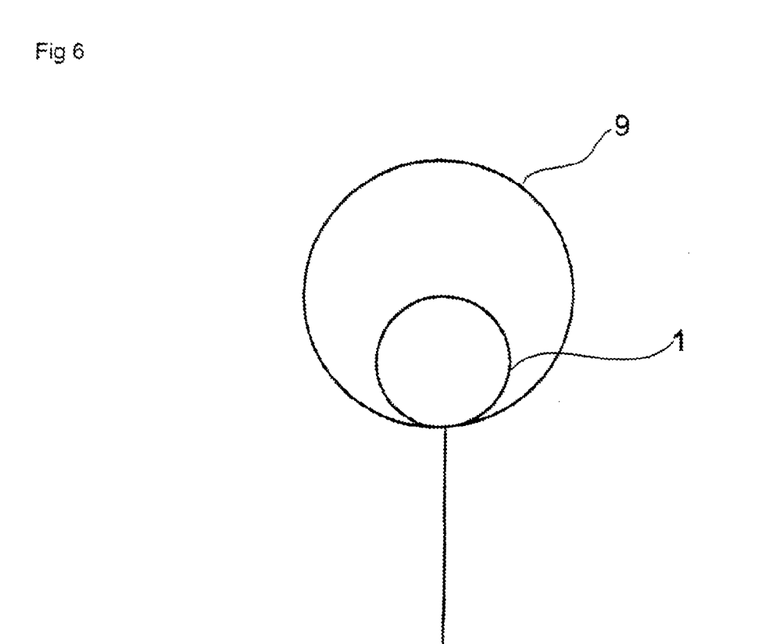
FIGS. 6 and 7 show cross sections of a further preferred embodiment of the present invention.
Figure 7:
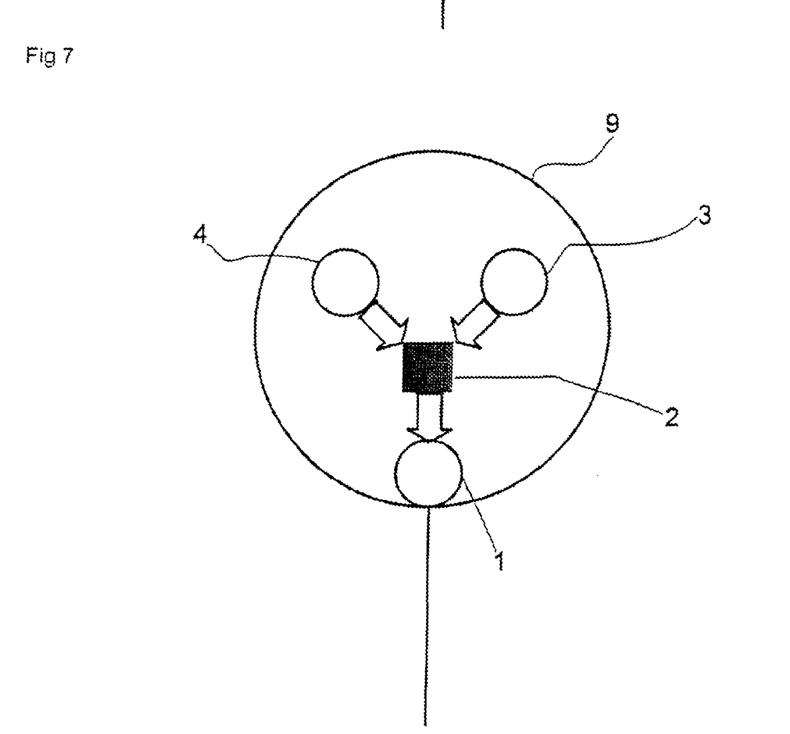

FIGS. 6 and 7 show cross sections of a further preferred embodiment of the present invention.

In this further preferred embodiment, at least one of the feeds (1), (2), (3) and (4) has a cooling jacket (9), the cooling jacket (9) being interrupted in the region of the multitude of bores.

These measures can likewise prevent undesired heating of the feeds (1), (2), (3) and (4).

Preferably at least one of the feeds (1), (2), (3) and (4) is additionally thermally insulated.

In order to increase the cooling action, combinations of the preferred embodiments are of course also possible.

Figure 8:
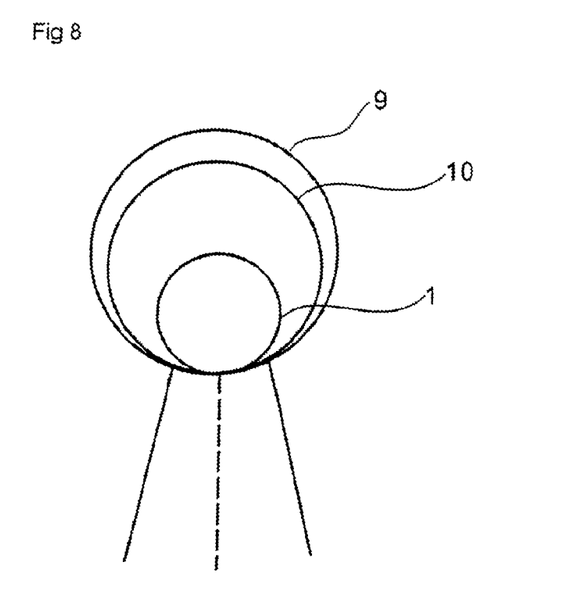
FIGS. 8 and 9 show cross sections of a further preferred embodiment of the present invention.
Figure 9:
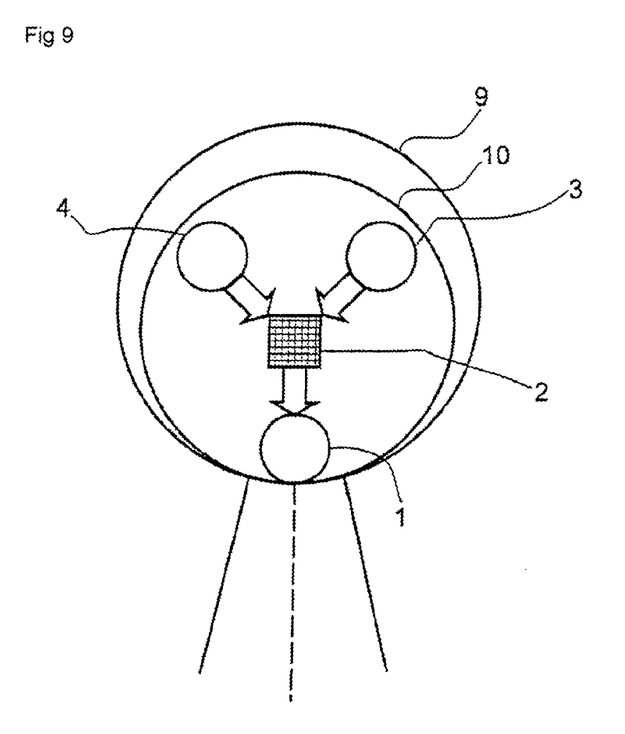

FIGS. 8 and 9 show cross sections of a further preferred embodiment of the present invention.

In this further preferred embodiment, at least one of the feeds (1), (2), (3) and (4) is surrounded by an additional gas purge (10), the gas purge (10) being interrupted in the region of the multitude of bores.

These measures can prevent ingress of cycle gas as a result of leaks. The gas purge (10) is preferably surrounded by a cooling jacket (9). The gas purge (10) may comprise additional rows of bores in parallel to the at least one row of bores. By means of these additional bores, the purge gas can be conducted at least partly into the reaction chamber.

The feed (1) preferably has a homogeneous cross section. Circular cross sections are particularly preferred.

Figure 10:
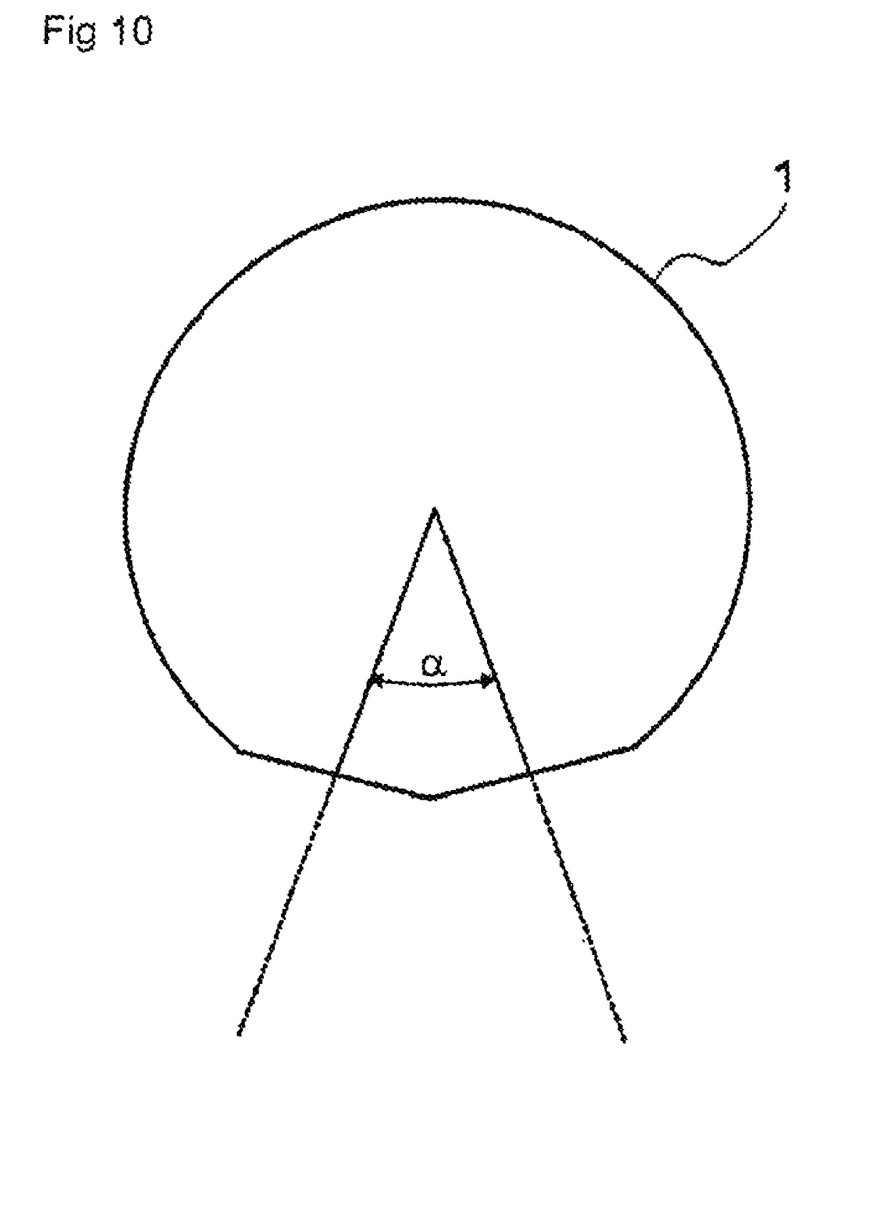
FIG. 10 shows an arrangement wherein a feed has two planar regions in the region of the bores, wherein verticals to the two planar regions intersect above the bores and form an angle α.

In a further preferred embodiment of the present invention, the feeds (1) are planar in the region of the bores. When the feed (1) has at least two rows of bores in the longitudinal direction, the feeds (1) advantageously have two planar regions in the region of the bores, each planar region having at least one row of bores and the verticals to the two planar regions in the cross section of the feed (1) intersecting above the bores and forming an angle (angle of intersection $\alpha$). The angle of intersection $\alpha$ is preferably 1 to 90°, more preferably 2 to 60°, most preferably 3 to 400. This arrangement improves the distribution of the droplets generated in the carrier gas. FIG. 10 shows an example of such an arrangement.

However, the feed (1) may also comprise more than two planar regions, for example three or four planar regions, each planar region having at least one row of bores.

The feeds (1), (2), (3) and (4) are preferably composed of a polymeric material, for example polyethylene, polypropylene, polyvinyl chloride, polyvinylidene fluoride, polyamide, polytetrafluoroethylene. The bores may advantageously be burnt into the polymeric material by means of a laser.

The polymeric material has, with respect to water, a contact angle of at least 60°, preferably at least 70°, more preferably at least 80°, most preferably at least 90°.

The contact angle is a measure of the wetting behavior of a liquid, especially water, with respect to a surface, and can be determined by customary methods, for example to ASTM D 5725 or DIN 53900. A low contact angle means good wetting and a high contact angle poor wetting.

The feeds (1), (3) and (4) may, for example, be cleaned with a pig. However, it is also possible to flush the multitude of bores from outside by means of a cleaning solution, for example water. Advantageously, the cleaning nozzle is conducted by means of a carriage on the feed (1).

Especially in the case of relatively inexpensive feeds (1) made of polymeric materials, it may, though, be more favorable to exchange the feeds (1) individually in the course of operation and to dispose of soiled feeds (1).

The type of monomers and their concentration in the liquid is not subject to any restriction. For instance, it is possible to polymerize monomers in bulk or as a solution in a suitable solvent, for example methanol, diethyl ether or water. In the process according to the invention, preference is given to using ethylenically unsaturated monomers.

Ethylenically unsaturated monomers are, for example, ethylenically unsaturated $C_3$-$C_6$-carboxylic acids. These compounds are, for example, acrylic acid, methacrylic acid, ethacrylic acid, α-chloroacrylic acid, crotonic acid, maleic acid, maleic anhydride, itaconic acid, citraconic acid, mesaconic acid, glutaconic acid, aconitic acid and fumaric acid, and the alkali metal or ammonium salts of these acids.

Further suitable monomers are acrylamidopropanesulfonic acid, vinylphosphonic acid and/or alkali metal or ammonium salts of vinylsulfonic acid, and acids may be used either in non-neutralized form or in partially or up to 100% neutralized form.

In addition, monoethylenically unsaturated sulfonic or phosphonic acids are useful as monomers, for example allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, allylphosphonic acid, styrenesulfonic acid and 2-acrylamido-2-methylpropanesulfonic acid.

Further suitable monomers are, for example, acrylamide, methacrylamide, crotonamide, acrylonitrile, methacrylonitrile, dimethylaminoethyl methacrylate, dimethylaminoethyl acrylate, dimethylaminopropyl acrylate, diethylaminopropyl acrylate, dimethylaminobutyl acrylate, dimethylaminoethyl methacrylate, diethylaminoethyl methacrylate, dimethylaminoneopentyl acrylate and dimethylaminoneopentyl methacrylate and quaternization products thereof, for example with methyl chloride, hydroxyethyl acrylate, hydroxyethyl methacrylate, hydroxypropyl acrylate and hydroxypropyl methacrylate.

Further suitable monomers are monomers which are obtainable by reacting nitrogen-containing heterocycles and/or carboxamides, such as vinylimidazole, vinylpyrazole and vinylpyrrolidone, vinylcaprolactam and vinylformamide, with acetylene, which may also be quaternized, for example with methyl chloride, and monomers which are also obtainable by reacting nitrogen compounds, such as diallyldimethylammonium chloride, with allyl alcohol or allyl chloride.

In addition, it is also possible to use vinyl and allyl esters and vinyl and allyl ethers, such as vinyl acetate, allyl acetate, methyl vinyl ether and methyl allyl ether, as monomers.

The monomers may be used alone or in a mixture with one another, for example mixtures comprising two or more monomers.

The process according to the invention is suitable, for example, for producing water-absorbing polymer particles. The production of water-absorbing polymer particles is described in the monograph "Modern Superabsorbent Polymer Technology", F. L. Buchholz and A. T. Graham, Wiley-VCH, 1998, pages 71 to 103.

Being products which absorb aqueous solutions, water-absorbing polymers are used to produce diapers, tampons, sanitary napkins and other hygiene articles, but also water-retaining agents in market gardening.

The droplets obtained comprise, for example,
a) at least one ethylenically unsaturated monomer,
b) at least one crosslinker,
c) at least one initiator and
d) water.

The monomers a) are preferably water-soluble, i.e. the solubility in water at 23° C. is typically at least 1 g/100 g of water, preferably at least 5 g/100 g of water, more preferably at least 25 g/100 g of water, most preferably at least 50 g/100 g of water, and preferably have at least one acid group each.

Suitable monomers a) are, for example, ethylenically unsaturated carboxylic acids such as acrylic acid, methacrylic acid, maleic acid, fumaric acid and itaconic acid. Particularly preferred monomers are acrylic acid and methacrylic acid. Very particular preference is given to acrylic acid.

The preferred monomers a) have at least one acid group, the acid groups preferably being at least partly neutralized.

The proportion of acrylic acid and/or salts thereof in the total amount of monomers a) is preferably at least 50 mol %, more preferably at least 90 mol %, most preferably at least 95 mol %.

The acid groups of the monomers a) are typically partly neutralized, preferably to an extent of from 25 to 85 mol %, preferentially to an extent of from 50 to 80 mol %, more preferably from 60 to 75 mol %, for which the customary neutralizing agents can be used, preferably alkali metal hydroxides, alkali metal oxides, alkali metal carbonates or alkali metal hydrogencarbonates, and mixtures thereof. Instead of alkali metal salts, it is also possible to use ammonium salts. Sodium and potassium are particularly preferred as alkali metals, but very particular preference is given to sodium hydroxide, sodium carbonate or sodium hydrogencarbonate, and mixtures thereof. Typically, the neutralization is achieved by mixing in the neutralizing agent as an aqueous solution, as a melt or preferably also as a solid. For example, sodium hydroxide with a water content significantly below 50% by weight may be present as a waxy material having a melting point above 23° C. In this case, metered addition as piece material or melt at elevated temperature is possible.

The monomers a), especially acrylic acid, comprise preferably up to 0.025% by weight of a hydroquinone monoether. Preferred hydroquinone monoethers are hydroquinone monomethyl ether (MEHQ).

The monomer solution comprises preferably at most 160 ppm by weight, preferentially at most 130 ppm by weight, more preferably at most 70 ppm by weight, preferably at least 10 ppm by weight, more preferably at least 30 ppm by weight, in particular around 50 ppm by weight, of hydroquinone monoether, based in each case on acrylic acid, acrylic acid salts also being considered as acrylic acid. For example, the monomer solution can be prepared by using acrylic acid having an appropriate content of hydroquinone monoether.

Crosslinkers b) are compounds having at least two polymerizable groups which can be polymerized by a free-radical mechanism into the polymer network. Suitable crosslinkers b) are, for example, ethylene glycol dimethacrylate, diethylene glycol diacrylate, allyl methacrylate, trimethylolpropane triacrylate, triallylamine, tetraallyloxyethane, as described in EP 530 438 A1, di- and triacrylates, as described in EP 547 847 A1, EP 559 476 A1, EP 632 068 A1, WO 93/21237 A1, WO 2003/104299 A1, WO 2003/104300 A1, WO 2003/104301 A1 and in DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/32962 A2.

Suitable crosslinkers b) are in particular N,N'-methylenebisacrylamide and N,N'-methylenebismethacrylamide, esters of unsaturated mono- or polycarboxylic acids of polyols, such as diacrylate or triacrylate, for example butanediol diacrylate, butanediol dimethacrylate, ethylene glycol diacrylate or ethylene glycol dimethacrylate, and also trimethylolpropane triacrylate and allyl compounds such as allyl (meth)acrylate, triallyl cyanurate, diallyl maleate, polyallyl esters, tetraallyloxyethane, triallylamine, tetraallylethylenediamine, allyl esters of phosphoric acid and vinylphosphonic acid derivatives, as described, for example, in EP 343 427 A2. Further suitable crosslinkers b) are pentaerythritol diallyl ether, pentaerythritol triallyl ether and pentaerythritol tetraallyl ether, polyethylene glycol diallyl ether, ethylene glycol diallyl ether, glycerol diallyl ether and glycerol triallyl ether, polyallyl ethers based on sorbitol, and ethoxylated variants thereof. In the process according to the invention, it is possible to use di(meth)acrylates of polyethylene glycols, the polyethylene glycol used having a molecular weight between 300 and 1000.

However, particularly advantageous crosslinkers b) are di- and triacrylates of 3- to 20-tuply ethoxylated glycerol, of 3- to 20-tuply ethoxylated trimethylolpropane, of 3- to 20-tuply ethoxylated trimethylolethane, in particular di- and triacrylates of 2- to 6-tuply ethoxylated glycerol or of 2- to 6-tuply ethoxylated trimethylolpropane, of 3-tuply propoxylated glycerol or of 3-tuply propoxylated trimethylolpropane, and also of 3-tuply mixed ethoxylated or propoxylated glycerol or of 3-tuply mixed ethoxylated or propoxylated trimethylolpropane, of 15-tuply ethoxylated glycerol or of 15-tuply ethoxylated trimethylolpropane, and also of 40-tuply ethoxylated glycerol, of 40-tuply ethoxylated trimethylolethane or of 40-tuply ethoxylated trimethylolpropane.

Very particularly preferred crosslinkers b) are the polyethoxylated and/or -propoxylated glycerols which have been esterified with acrylic acid or methacrylic acid to give di- or triacrylates, as described, for example in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol.

The monomer solution comprises preferably at least 0.1% by weight, preferentially at least 0.2% by weight, more preferably at least 0.3% by weight, most preferably at least 0.4% by weight, of crosslinker b), based in each case on monomer a).

The initiators c) used may be all compounds which disintegrate into free radicals under the polymerization conditions, for example peroxides, hydroperoxides, hydrogen peroxide, persulfates, azo compounds and redox initiators. Preference is given to the use of water-soluble initiators. In some cases, it is advantageous to use mixtures of various initiators, for example mixtures of hydrogen peroxide and sodium or potassium peroxodisulfate. Mixtures of hydrogen peroxide and sodium peroxodisulfate can be used in any proportion.

Particularly preferred initiators c) are azo initiators such as 2,2'-azobis[2-(2-imidazolin-2-yl)propane]dihydrochloride and 2,2'-azobis[2-(5-methyl-2-imidazolin-2-yl)propane]dihydrochloride, and photoinitiators such as 2-hydroxy-2-methylpropio-phenone and 1-[4-(2-hydroxyethoxy)phenyl]-2-hydroxy-2-methyl-1-propan-1-one, redox initiators such as sodium persulfate/hydroxymethylsulfinic acid, ammonium peroxodisulfate/hydroxy-methylsulfinic acid, hydrogen peroxide/hydroxymethylsulfinic acid, sodium persulfate/ascorbic acid, ammonium peroxodisulfate/ascorbic acid and hydrogen peroxide/ascorbic acid, photoinitiators such as 1-[4-(2-hydroxyethoxy)-phenyl]-2-hydroxy-2-methyl-1-propan-1-one, and mixtures thereof.

The initiators are used in customary amounts, for example in amounts of from 0.001 to 5% by weight, preferably from 0.01 to 1% by weight, based on the monomers a).

The polymerization inhibitors can also be removed by absorption, for example on activated carbon.

The solids content of the monomer solution is preferably at least 35% by weight, preferentially at least 38% by weight, most preferably at least 40% by weight, most preferably at least 42% by weight. The solids content is the sum of all constituents which are involatile after the polymerization. These are monomer a), crosslinker b) and initiator c).

The oxygen content of the monomer solution is preferably at least 1 ppm by weight, more preferably at least 2 ppm by weight, more preferably at least 5 ppm by weight. It is therefore possible to substantially dispense with the customary inertization of the monomer solution.

The elevated oxygen content stabilizes the monomer solution and enables the use of smaller amounts of polymerization inhibitor, and thus prevents the product discolorations caused by the polymerization inhibitor.

The monomer solution is metered into the gas phase for the polymerization. The oxygen content of the gas phase is preferably from 0.001 to 0.15% by volume, more preferably from 0.002 to 0.1% by volume, most preferably from 0.005 to 0.05% by volume.

As well as oxygen, the gas phase preferably comprises only inert gases, i.e. gases which, under reaction conditions, do not intervene in the polymerization, for example nitrogen and/or steam.

The polymerization reactor is flowed through by a gas. The carrier gas can be conducted through the reaction chamber in cocurrent or in countercurrent to the free-falling droplets of the monomer solution, preferably in cocurrent, i.e. from the bottom upward. After one pass, the gas is preferably recycled at least partly, preferably to an extent of at least 50%, more preferably to an extent of at least 75%, into the reaction chamber as cycle gas. Typically, a portion of the carrier gas is discharged after each pass, preferably up to 10%, more preferably up to 3% and most preferably up to 1%.

The gas velocity is preferably adjusted such that the flow in the polymerization reactor is directed, for example no convection currents opposed to the general flow direction are present, and is, for example, from 0.01 to 5 m/s, preferably from 0.02 to 4 m/s, more preferably from 0.05 to 3 m/s, most preferably from 0.1 to 2 m/s.

The gas flowing through the reactor is appropriately preheated to the reaction temperature upstream of the reactor.

The reaction temperature in the thermally induced polymerization is preferably from 100 to 250° C., more preferably from 120 to 200° C. and most preferably from 150 to 180° C.

The reaction can be carried out under elevated pressure or under reduced pressure; preference is given to a reduced pressure of up to 100 mbar relative to ambient pressure.

The reaction offgas, i.e. the gas leaving the reaction chamber, may, for example, be cooled in a heat exchanger. This condenses water and unconverted monomer a). The reaction offgas can then be reheated at least partly and recycled into the reactor as cycle gas. A portion of the reaction offgas can be discharged and replaced by fresh gas, in which case water and unconverted monomers a) present in the reaction offgas can be removed and recycled.

Particular preference is given to a thermally integrated system, i.e. a portion of the waste heat in the cooling of the offgas is used to heat the cycle gas.

The reactors can be trace-heated. In this case, the trace heating is adjusted such that the wall temperature is at least 5° C. above the internal reactor temperature and condensation on the reactor walls is reliably prevented.

The reaction product can be withdrawn from the reactor in a customary manner, and, if desired, dried down to the desired residual moisture content and to the desired residual monomer content.

The reaction product is preferably dried in at least one fluidized bed.

The polymer particles can be postcrosslinked for further improvement of the properties.

Postcrosslinkers are compounds which comprise at least two groups which can form covalent bonds with the carboxylate groups of the hydrogel. Suitable compounds are, for example, alkoxysilyl compounds, polyaziridines, polyamines, polyamidoamines, di- or polyepoxides, as described in EP 83 022 A2, EP 543 303 A1 and EP 937 736 A2, di- or polyfunctional alcohols as described in DE 33 14 019 A1, DE 35 23 617 A1 and EP 450 922 A2, or β-hydroxyalkylamides, as described in DE 102 04 938 A1 and U.S. Pat. No. 6,239,230.

In addition, DE 40 20 780 C1 describes cyclic carbonates, DE 198 07 502 A1 describes 2-oxazolidone and its derivatives such as 2-hydroxyethyl-2-oxazolidone, DE 198 07 992 C1 describes bis- and poly-2-oxazolidinones, DE 198 54 573 A1 describes 2-oxotetrahydro-1,3-oxazine and its derivatives, DE 198 54 574 A1 describes N-acyl-2-oxazolidones, DE 102 04 937 A1 describes cyclic ureas, DE 103 34 584 A1 describes bicyclic amide acetals, EP 1 199 327 A2 describes oxetanes and cyclic ureas, and WO 2003/31482 A1 describes morpholine-2,3-dione and its derivatives, as suitable postcrosslinkers.

The amount of postcrosslinker is preferably from 0.01 to 1% by weight, more preferably from 0.05 to 0.5% by weight, most preferably from 0.1 to 0.2% by weight, based in each case on the polymer.

The postcrosslinking is typically performed in such a way that a solution of the postcrosslinker is sprayed onto the hydrogel or the dry polymer particles. The spraying is followed by thermal drying, and the postcrosslinking reaction can take place either before or during the drying.

The spraying of a solution of the crosslinker is preferably performed in mixers with moving mixing tools, such as screw mixers, paddle mixers, disk mixers, plowshare mixers and shovel mixers. Particular preference is given to vertical mixers, very particular preference to plowshare mixers and shovel mixers. Suitable mixers are, for example, Lödige mixers, Bepex mixers, Nauta mixers, Process all mixers and Schugi mixers.

The thermal drying is preferably carried out in contact dryers, more preferably paddle dryers, most preferably disk dryers. Suitable dryers are, for example, Bepex dryers and Nara dryers. Moreover, it is also possible to use fluidized bed dryers.

The drying can be effected in the mixer itself, by heating the jacket or blowing in warm air. Equally suitable is a downstream dryer, for example a staged dryer, a rotary tube oven or a heatable screw. It is particularly advantageous to mix and dry in a fluidized bed dryer.

Preferred drying temperatures are in the range from 170 to 250° C., preferably from 180 to 220° C. and more preferably from 190 to 210° C. The preferred residence time at this temperature in the reaction mixer or dryer is preferably at least 10 minutes, more preferably at least 20 minutes, most preferably at least 30 minutes.

The process according to the invention enables the production of water-absorbing polymer particles with uniform properties.

The water-absorbing polymer particles obtainable by the process according to the invention have a centrifuge retention capacity (CRC) of typically at least 15 g/g, preferably at least 20 g/g, preferentially at least 25 g/g, more preferably at least 30 g/g, most preferably at least 35 g/g. The centrifuge retention capacity (CRC) of the water-absorbing polymer particles is typically less than 100 g/g. The centrifuge retention capacity of the water-absorbing polymer particles is determined by the EDANA (European Disposables and Nonwovens Association) recommended test method No. 441.2-02 "Centrifuge retention capacity".

The mean diameter of the water-absorbing polymer particles obtainable by the process according to the invention is preferably at least 200 μm, more preferably from 250 to 600 μm, very particularly from 300 to 500 μm, the particle diameter being determinable by light scattering and meaning the volume-average mean diameter. 90% of the polymer particles have a diameter of preferably from 100 to 800 μm, more preferably from 150 to 700 μm, most preferably from 200 to 600 μm.

The present invention further provides apparatus for performing the process according to the invention.

The invention claimed is:

1. A process for producing polymer particles by polymerizing liquid droplets in a gas phase by metering a liquid comprising at least one monomer from at least one feed (1) by means of a multitude of bores into a reaction chamber comprising the gas phase, wherein a ratio of length of the feed (1) to greatest diameter of the feed (1) in a region of the multitude of bores is at least 10.

2. The process according to claim 1, wherein a plurality of feeds (1) lead radially into an upper part of the reaction chamber.

3. The process according to claim 1, wherein the multitude of bores is arranged in at least one row along the feed (1).

4. The process according to claim 1, wherein the multitude of bores is arranged in at least two rows offset with respect to one another along the feed (1).

5. The process according to claim 1, wherein the feed (1) is planar in the region of the bores.

6. The process according to claim 1, wherein the feed (1) has at least two rows of bores in a longitudinal direction and, in the region of the bores, two planar regions, each planar region having at least one row of bores and verticals to the two planar regions in the cross section of the feed (1) intersecting above the bores and forming an angle.

7. The process according to claim 1, wherein the bores have a diameter of from 50 to 1000 μm.

8. The process according to claim 1, wherein the a pressure in the feed line (1) is at least 0.1 bar.

9. The process according to claim 1, wherein the liquid passes into the feed (1) through a plurality of feeds (2).

10. The process according to claim 9, wherein the liquid passes into the feed (2) through a feed (3), and a second liquid comprising at least one initiator through a feed (4).

11. The process according to claim 10, wherein the feeds (2) comprise static mixers.

12. The process according to claim 10, wherein at least one of the feeds (1), (2), (3) and (4) is cooled and/or a separate gas stream flows around it.

13. The process according to claim 1, wherein gas with a temperature of from 90 to 300° C. is introduced from above into the reaction chamber by means of at least one gas feed (5) and the at least one gas feed (5) ends below the feed (1).

14. The process according to claim 13, wherein gas with a temperature of from 0 to 60° C. is introduced from above into the reaction chamber by means of at least one gas feed (6) and the at least one gas feed (6) ends above the feed (1).

15. The process according to claim 12, wherein the liquid is conveyed in circulation in at least one of the feeds (1), (3), and (4) partly via a cooler (8).

16. The process according to claim 12, wherein at least one of the feeds (1), (2), (3) and (4) has a cooling jacket (9), the cooling jacket (9) being interrupted in the region of the multitude of bores.

17. The process according to claim 10, wherein at least one of the feeds (1), (2), (3) and (4) is additionally thermally insulated.

18. The process according to claim 10, wherein at least one of the feeds (1), (2), (3) and (4) comprises a polymeric material.

19. The process according to claim 1, wherein the monomer is acrylic acid to an extent of at least 50 mol %.

20. The process according to claim 1, wherein the polymer particles have a centrifuge retention capacity of at least 15 g/g.

21. The process according to claim 1, wherein the feed (1) is cooled and/or a separate gas stream flows around it.

22. The process according to claim 1, wherein the feed (1) is additionally thermally insulated.

23. The process according to claim 1, wherein the feed (1) comprises a polymeric material.

* * * * *